(12) United States Patent  
Circello et al.

(10) Patent No.: US 7,433,803 B2  
(45) Date of Patent: Oct. 7, 2008

(54) PERFORMANCE MONITOR WITH PRECISE START-STOP CONTROL

(75) Inventors: Joseph C. Circello, Phoenix, AZ (US); Daniel M. McCarthy, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 549 days.

(21) Appl. No.: 11/116,672

(22) Filed: Apr. 27, 2005

(65) Prior Publication Data

US 2006/0248410 A1 Nov. 2, 2006

(51) Int. Cl.
*G06F 11/30* (2006.01)

(52) U.S. Cl. .................. 702/186; 702/182; 714/38; 714/37; 714/39; 714/47; 714/E11.2; 717/127; 712/227

(58) Field of Classification Search ........... 702/182, 702/186; 714/733, 732, 30, 29, 28, 37, 39, 714/38, 44, 47, 127, E11.192, E11.2; 712/227, 712/209; 717/127

See application file for complete search history.

(56) References Cited

U.S. PATENT DOCUMENTS

| | | | | |
|---|---|---|---|---|
| 5,751,945 A | * | 5/1998 | Levine et al. ................. 714/47 |
| 5,752,062 A | * | 5/1998 | Gover et al. ................. 714/37 |
| 5,774,724 A | * | 6/1998 | Heisch ....................... 717/129 |
| 5,797,019 A | * | 8/1998 | Levine et al. ............... 710/262 |
| 6,067,644 A | * | 5/2000 | Levine et al. ................. 714/47 |
| 6,134,676 A | * | 10/2000 | VanHuben et al. ........... 714/39 |
| 6,374,364 B1 | * | 4/2002 | McElroy et al. ............. 714/10 |
| 6,446,029 B1 | | 9/2002 | Davidson et al. |
| 7,062,684 B2 | * | 6/2006 | DeWitt et al. ................ 714/45 |
| 2004/0064290 A1 | | 4/2004 | Cabral et al. |
| 2005/0155026 A1 | * | 7/2005 | DeWitt et al. ............... 717/158 |
| 2006/0048011 A1 | * | 3/2006 | Dieffenderfer et al. ....... 714/38 |

OTHER PUBLICATIONS

MIPS R10000 Microporcessor User's Manual, Mips Technologies, Inc., Version 2 of Jan. 29, 1997, pp. 264-272.

Intel XScale Core Developer's Manual, Intel Corporation, Jan. 2004, pp. 101-120.

MPC750 RISC Microprocessor Family User's Manual, Freescale Semiconductor, Inc., pp. 373-384.

* cited by examiner

*Primary Examiner*—Carol S Tsai  
(74) *Attorney, Agent, or Firm*—Ingrassia, Fisher & Lorenz, P.C.

(57) ABSTRACT

A system and method for performance monitoring in processors is provided. The system and method evaluates the performance of the processor by counting selected events during one or more defined periods. The performance monitor provides improved performance characterization by providing highly-configurable start-stop control over the event counting.

17 Claims, 4 Drawing Sheets

PERFORMANCE MONITOR WITH PRECISE START-STOP CONTROL

FIELD OF THE INVENTION

This invention generally relates to processors, and more specifically relates to performance monitoring in processors.

BACKGROUND OF THE INVENTION

Processors are used in an ever expanding array of devices. For example, high end processors are found in a variety of computing devices, including servers, personal computers and personal digital assistants (PDAs). Processors are also found in other electronic devices such as communication devices, media players and gaming devices. Increasingly, processors are found in peripherals such as printers, scanners and monitors. In all these cases the processor performs a variety of processing functions to implement the device.

As the use of processors increases one progressively more important issue is the ability to monitor and evaluate the performance of the processor. To accomplish this, performance monitors are commonly included in modem high-performance processors. The performance monitors provide the ability to evaluate the performance of the processor. As one example, the performance monitors provide the ability to characterize the operation of the processor by counting the number of selected events that occur during a time period. The events that are counted can include a wide variety of different operations, such as instructions executed, memory reads and cache misses. By providing a mechanism for counting these events over a time period, the performance monitor provides the ability to characterize the performance of the processor. This can then be used to optimize the system, for example, by optimizing the performance of software designed to be executed by the processor.

Additionally, hardware performance monitors provide the ability to measure performance of the system without requiring the modification of existing software application being tested. This is particularly important in many embedded applications where the software application is loaded into a non-volatile memory. In these cases modifying the software application for performance analysis would be very cumbersome, or in the case of a read-only memory, impossible.

One issue with current performance monitors is the lack of control provided over the time period in which events are counted. In typical performance monitors the counting is started and stopped explicitly. For example, the performance monitor is started by setting a selected bit field visible to a monitoring program. Requiring that counting be explicitly started and stopped provides only coarse control of the events being counted. This coarse resolution of control limits the effectiveness of the performance monitor in evaluating the system and thus limits the ability to fully optimize the operation of the system.

Specifically, such a coarse resolution of control limits the ability of the performance monitor to be used on specific windows of interest in the code. In a typical performance analysis process, it can be desirable to perform repeated executions of particular code portions. For example, the repeated executions of code could be those portions of code which are most frequently used and thus contribute greatly to the overall performance of the system. As the process is refined, these windows of interest are generally made smaller as "hot spots" in the code are located. Past performance monitors with limited control have been unable to provide effective performance monitoring that focuses on specific portions of code, and thus have had limited effectiveness in optimizing the operation of the system.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for performance monitoring in processors. In general, the performance monitor evaluates the performance of the processor by counting selected events during one or more defined periods. The performance monitor provides improved performance characterization by providing highly-configurable start-stop control over the event counting.

Figure 1:
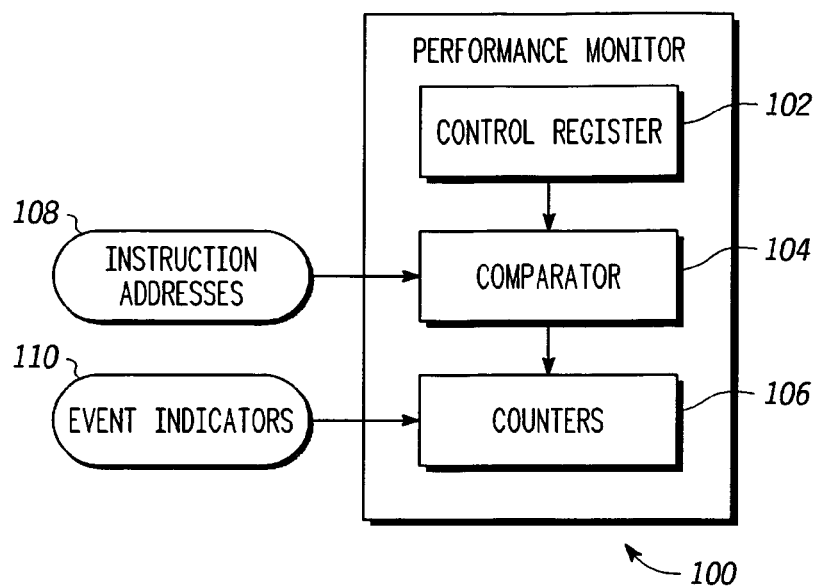
FIG. 1 is a schematic view of an performance monitor in accordance with an embodiment of the invention.

Turning now to FIG. 1, a performance monitor 100 is illustrated schematically. The performance monitor 100 includes control register 102, comparator 104 and counters 106. The performance monitor 100 receives current instruction addresses 108 and event indicators 110 from the processor. The control register 102 stores selected instruction addresses that will be used to precisely control the starting and stopping of the counters 106. When started, the counters 106 record selected event indicators 110, counting the number of selected events until the counters 106 are stopped or a specified value is reached. The number of events in the counters 106 can then be used to characterize the performance of the processor.

The performance monitor 100 provides very precise control of the starting and stopping of the counters 106 and can thus provides accurate performance monitoring. Specifically, during operation of the performance monitor 100, the comparator 104 compares the selected instruction addresses stored in control register 102 to the instruction addresses 108 of the instruction currently being executed. When a first instruction address in the control register 102 matches the instruction address 108 of the currently executing instruction, the performance monitor 100 starts counting selected events using the counters 106. Later, when a second instruction address in the control register 102 matches the instruction address 108 of the currently executing instruction, the performance monitor 100 stops counting selected events. Thus, the performance monitor 100 is able to precisely control event counting to coincide with selected instruction addresses that correspond to specific pieces of code in the system. This precise control of the performance monitor 100 facilitates accurate counting of selecting events in a very specific region of executing code. Thus, the performance monitor 100 is able to precisely count events that occur within this region, and is able to accurately characterize the performance of specific pieces of code.

In some embodiments, the performance monitor 100 can be configured to selectively start and stop each time a selected instruction address in the control register 102 matches the instruction address 108 of the currently executing instruction. Thus, the performance monitor can count events through multiple runs of a selected code section of interest. Furthermore, in some embodiments the performance monitor 100 is configured to selectively function as a traditional performance monitor. In this embodiment the performance monitor 100 can be configured to unconditionally count when selected control fields are enabled, and unconditionally stop when the selected control fields are disabled.

In general, the performance monitor 100 would be implemented with, or as part of, a processor. Thus, the performance monitor would commonly be fabricated on the same wafer or die as the processor, and some elements of the performance monitor could serve other functions in the processor. The processor with the performance monitor 100 would typically be used in an electronic device. As such, the processor would commonly be coupled to a bus, memory and other devices. The processor can include any type of processing device, including microprocessors, microcontrollers, digital signal processors and other such devices.

As described above, the performance monitor 100 receives current instruction addresses 108 and event indicators 110 from the processor. The control register 102 stores selected instruction addresses that will be used to precisely control the starting and stopping of the counters 106. Specifically, during operation of the performance monitor 100, the comparator 104 compares the selected instruction addresses stored in control register 102 to the instruction addresses 108 of the instruction currently being executed.

When a first instruction address in the control register 102 matches the instruction address 108 of the currently executing instruction, the performance monitor 100 starts counting selected events using the counters 106. Later, when a second instruction address in the control register 102 matches the instruction address 108 of the currently executing instruction, the performance monitor 100 stops counting selected events. Thus, the performance monitor 100 is able to precisely control event counting to coincide with selected instruction addresses that correspond to specific pieces of code in the system.

In one embodiment, the instruction addresses stored in the control registers can be appended to other control data. For example, address attributes can be appended to the instruction addresses and used to identify if the processor is executing in supervisor or user mode. These additional attributes can be appended to the instruction addresses and included in the comparison performed by the comparators. The result of the comparison is then used to identify the operating mode of the processor. Thus, the performance monitor can be configured to start and/or stop counting only when the processor is in a particular operating mode (e.g., supervisor or user mode). As another example, the address attributes can be used to indicate if the processor is operating in a virtual-memory environment. In this case the performance monitor can then use a process or address space identifier to distinguish between multiple occurrences of a virtual memory address.

Figure 2:
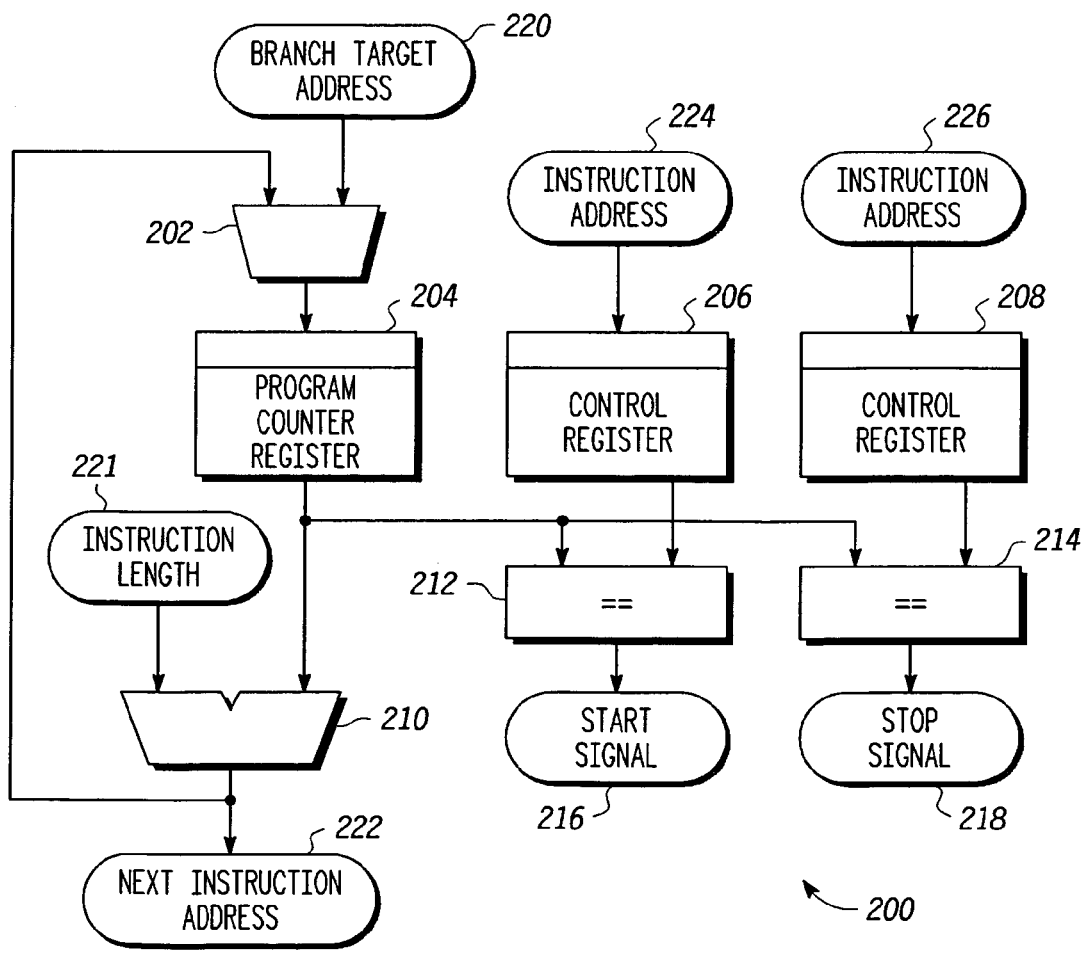
FIG. 2 is a schematic view of a processor portion in accordance with an embodiment of the invention.

Turning now to FIGS. 2-5, a detailed exemplary embodiment of a hardware performance monitor is illustrated. In the example of FIGS. 2-5, two counter registers are used to count two different selected events, and a third counter register is dedicated to counting clock cycles. Of course, this is just one example of how a hardware performance monitor can be implemented. To fully illustrate the operation of the performance monitor, FIGS. 2-5 illustrate the elements of performance monitor together with other elements of the processor. Turning now to FIG. 2 individually, a schematic view of a control registers implemented with a processor portion 200 is illustrated. In this implementation, the processor portion 200 includes a multiplexer 202, a program counter register 204, a control register 206, a control register 208, an adder 210, a comparator 212 and a comparator 214. The portion 200 receives a branch target address 220, an instruction length 221, an instruction address 224 and an instruction address 226. The portion 200 outputs a start signal 216, a stop signal 218, and a next instruction address 222.

In general, the program counter register 204 stores the instruction address for the instruction that is currently being executed by the processor. As the processor executes, the instruction address stored in the program counter register 204 is updated by the output of the multiplexer 202. Specifically, when a branch instruction is "taken", the branch target address 220 provides the new instruction address through the multiplexer 202. Conversely, during processing where instructions are being executed sequentially, the adder 210 is used to increment the current instruction address by an amount specified in the instruction length 221. Specifically, the output of the adder 210 is equal to the address in the program counter plus the instruction length 221. Thus, when fed back into the program counter register 204 through the multiplexer 202, the adder 210 output updates the program counter register 204 with the next sequential instruction address. Thus, in both cases the program counter register 204 stores the instruction address of the instruction being currently executed by the processor. It should be noted that this is just one example of how the program counter register 204 could be implemented to store the instruction address, and that other techniques could also be used.

The control registers 206 and 208 are used to store instruction addresses which will be used to control operation of the counters in the performance monitor. Specifically, control register 206 stores an instruction address 224 that is used to generate a start signal 216 for starting event counting. Likewise, the counter register 208 stores an instruction address 226 that is used to generate a stop signal 218 for stopping event counting. The instruction addresses 224 and 226 can be loaded into the control register using any suitable technique. One exemplary technique is to configure the control register 206 and 208 as memory mapped registers. In this example the instruction addresses 224 and 226 can be loaded into the control registers using memory writes controlled by appropriate software. It should be noted that while FIG. 2 illustrates the control registers 206 and 208 as two separate registers, they could also be implemented as parts of the same register. Additionally, in some embodiments the control registers 206 and 208 can be implemented and used in other additional functions, such as additionally being used as break point registers during other debugging operations. Furthermore, the control registers 206 and 208 could be implemented to store additional control fields used to control the operation of the performance monitor. Likewise, while, comparators 212 and 214 are illustrated as two separate comparators, they could be implemented with single comparator.

The comparators 212 and 214 are used to compare the instruction addresses in the control registers 206 and 208 with the instruction address in the program counter register 204. Specifically, during operation of the performance monitor, the comparator 212 compares the selected instruction addresses stored in control register 206 to the instruction addresses stored in program counter register 204. When the instruction address in the control register 206 matches the instruction address in the program counter register 204, the start signal 216 is enabled. This starts the counters in the performance monitor, and thus starts event counting. As the processor continues to execute, the instruction address in the program counter register 204 is continually updated as described above. When the instruction address in the program counter register 204 is updated to match the instruction address in the control register 208, the stop signal is enabled. This stops the counters in the performance monitor. Thus, the performance monitor is precisely controlled to event count only specifically selected instruction addresses that correspond to specific pieces of code in the system. This precise control of the performance monitor facilitates accurate counting of selecting events in a very specific region of executing code. Again, it should be noted that the processor portion 200 is just one example of how control registers can be used to generate start and stop signals used to control the counting in the performance monitor.

Figure 3:
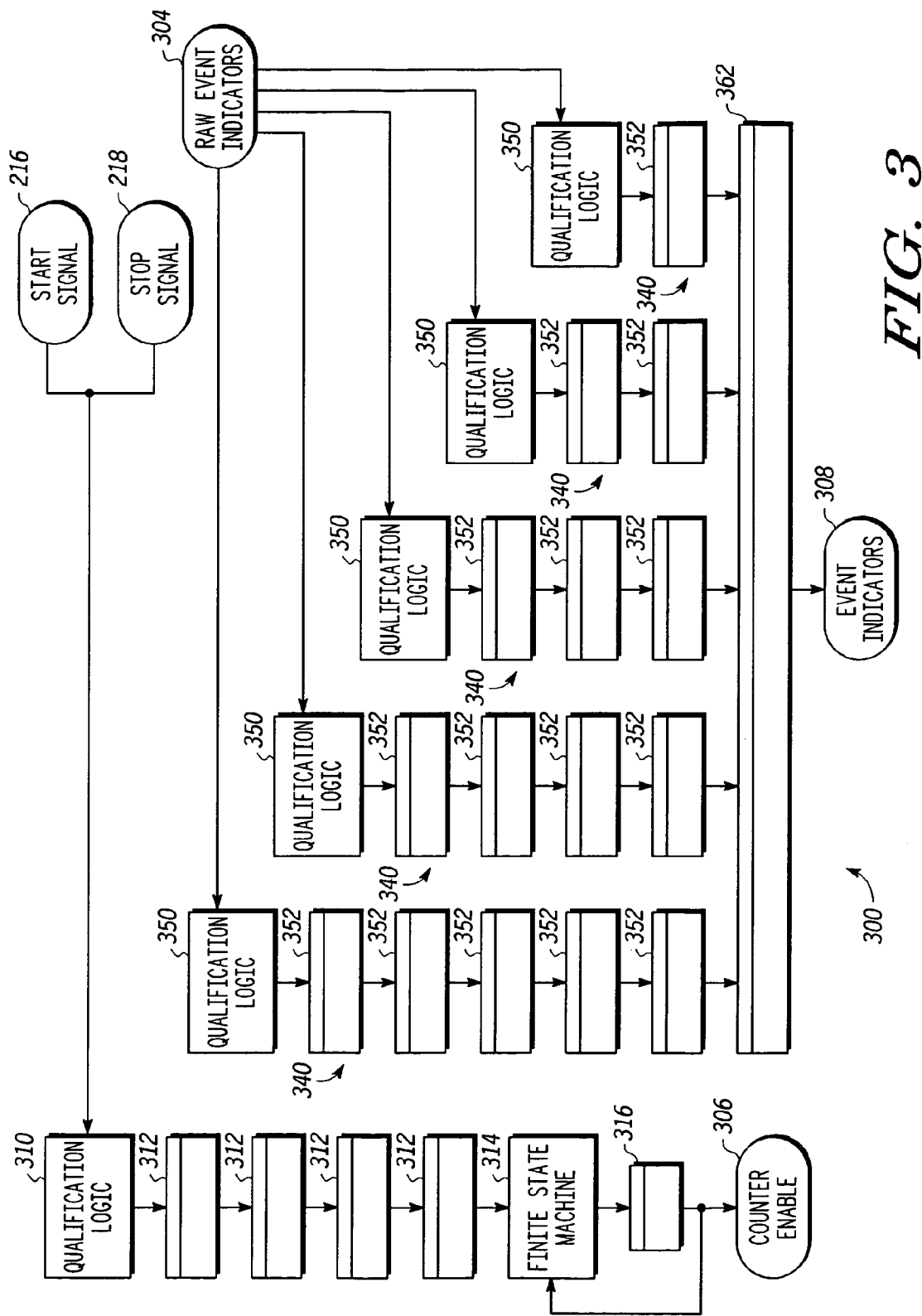
FIG. 3 is a schematic view of a processor portion in accordance with an embodiment of the invention.

Turning now to FIG. 3, a schematic view of a second processor portion 300 is illustrated. In general, processor portion 300 receives start signal 216, stop signal 218 and raw event indicators 304, and generates a counter enable signal 306 and event indicators 308. The start signal 216 and stop signal 218 are received by qualification logic 310. In general, the qualification logic 310 determines when to sample the start signal 216 and stop signal 218. This qualifies the start/stop signals, and avoids errors that could otherwise occur when the raw signals fluctuate between states. For example, the qualification logic 310 can be configured to sample the start signal 216 and stop signal 218 only once per instruction in the processor, at the first clock cycle of the instruction.

The qualified start/stop signals are then passed through the pipeline registers 312. The pipeline registers 312 are designed to align the arrival of the qualified start/stop signals with the appropriate pipeline stage executing the corresponding instruction in the processor. Thus, the number of pipeline registers 312 included in the start/stop signal pipeline would depend upon the number of stages in the processor pipeline, and where in the processor pipeline the start/stop signals were generated. For example, if the start/stop signals were generated from the top of the pipeline, the number of stages in the start/stop signal pipeline would typically be equal to the number of stages in the processor pipeline. Of course, this is just one example of how the qualified stop/start signals can be made to align with the arrival with the corresponding instruction.

When passed through the pipeline registers 312 the qualified start/stop signals arrive at the finite state machine 314. In general, the finite state machine 314 and finite state machine register 3,16 are configured to generate the counter enable signal 306 from the qualified stop/stop signals. The counter enable signal 306 is then used to control the counting in the performance monitor. For example, the finite state machine 314 and finite state machine register 316 can be configured to start and stop the counting at instruction boundaries in the processor. This can improve the consistency and repeatability of the measurements by defining the start and stop conditions in a very precise manner. In this example, the finite stage machine 314 and finite state machine register 316 generate the counter enable signal 306 on the first instruction boundary following the arrival of the qualified start/stop signal.

Figure 4:
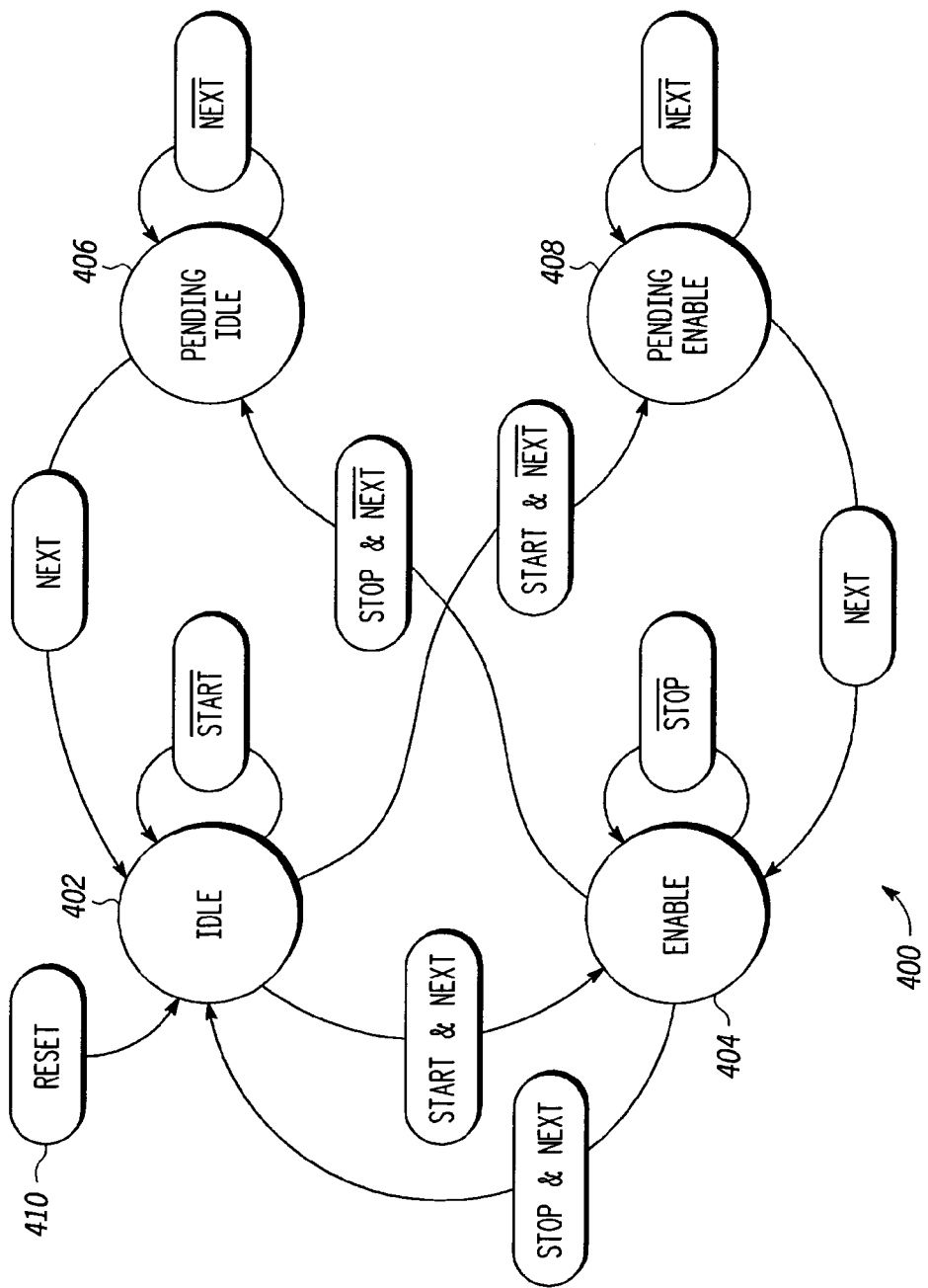
FIG. 4 is a state machine flow diagram in accordance with an embodiment of the invention.

Turning briefly to FIG. 4, an exemplary state machine flow 400 is illustrated. The state machine flow 400 is configured to enable counting and disable counting of the counters on instruction boundaries in the processor. Thus, the state machine flow 400 is one example of how the finite state machine 314 and finite state machine register 316 in FIG. 3 can be implemented. The state machine flow 400 includes four states, an idle state 402, an enable state 404, a pending idle state 406, and a pending enable state 408. The state machine flow 400 is controlled by start and stop signals, and by a next signal. The start and stop signals are generated from the control registers, for example, as illustrated in FIGS. 2 and 3. The next signal is asserted at the boundary of each instruction in the processor. The state machine flow 400 also receives a reset signal 410 that puts the state machine in the idle state 402 to facilitate the initialization of the state machine to a known state.

In the idle state 402, the state machine flow 400 disables the clock enable signal, thus stopping the counting of the counters in the performance monitor. In the enable state 404, the state machine flow asserts the counter enable signal, thus starting the counting of the counters in the performance monitor. This can be accomplished by setting appropriate bits in the finite state machine register 316 of FIG. 3, and using those bits as the counter enable signal 306.

When in the idle state 402, the state machine 400 stays in the idle state 402 as long as the start signal is not asserted. Likewise, when in the enable state 404, the state machine 400 stays in the enable state 404 as long as the stop signal is not asserted.

When in the idle state 402, the state machine 400 transitions to the enable state 404 when the start signal is asserted and the next signal is asserted. Thus, the state machine 400 transitions to the enable state 404 on the instruction boundary. Likewise, when in the idle state 402, the state machine 400 transitions to the pending enable state 408 when the start signal is asserted and the next signal is not asserted. The state machine 400 then stays in the pending enable state 408 until the next signal is asserted. Thus, the state machine 400 transitions to the enable state 404 on the next instruction boundary after the start signal was asserted.

Likewise, when in the enable state 404, the state machine 400 transitions to the idle state 402 when the stop signal is asserted and the next signal is asserted. Thus, the state machine 400 transitions to the idle state 402 on the instruction boundary. Likewise, when in the enable state 404, the state machine 400 transitions to the pending idle state 406 when the stop signal is asserted and the next signal is not asserted. The state machine 400 then stays in the pending idle state 406 until the next signal is asserted. Thus, the state machine 400 transitions to the idle state 402 on the next instruction boundary after the stop signal was asserted.

Returning to FIG. 3, the finite state machine 314 and finite state machine register 316 can thus be implemented to generate a counter enable signal 306 from the start and stop signals, with the counter enable signal generated and aligned with the instruction boundaries in the processor.

The processor portion 300 also receives the raw event indicators 304. The raw event indicators 304 are each passed to one of a plurality of qualification logic 350. The raw event indicators 304 would comprise a plurality of signals from the processor corresponding to events in the processor. For example, the raw event indicators could correspond to clock cycles, instructions executed, memory reads and cache misses to just name a few. A typical modem processor could easily generate a hundred different types of raw event indicators. These raw event indicators 304 would be generated at different pipeline stages in the processor, and would preferably be passed to a qualification logic 350 that corresponds to its pipeline stage where it was generated.

In general, each qualification logic 350 determines when to sample the raw event indicators 304. This qualifies the raw event indicators 304, and avoids errors that could otherwise occur when the raw signals fluctuate between states. For example, the qualification logic 350 can be designed to sample the raw event indicators 304 only once per instruction in the processor.

Each qualification logic 350 passes the qualified raw event indicators into a corresponding indicator pipeline 340. Each indicator pipeline 340 includes one or more indicator stage registers 352. The indicator stage registers 352 are designed to align the arrival of the qualified raw event indicators with processing of their corresponding instruction in the processor. Thus, the number of indicator stage registers 352 included in each corresponding pipeline 340 would depend upon the number of stages in the processor pipeline, and where in the processor pipeline the raw event indicators were generated. For example, if a raw event indicator 304 was generated from the top of the processor pipeline, the number of stages in the indicator pipeline 340 would typically be equal to the number of stages in the processor pipeline. A raw event indicator 304 generated further down the processor pipeline would be passed to the indicator pipeline 340 with less stages. Of course, this is just one example of how the qualified raw indicator signals can be made to align the arrival with the corresponding instruction.

The qualified raw event indicators are passed from the indicator stage pipelines 340 to an accumulated event register 362. The accumulated event register 362 receives and stores all the event indicators that arrive at one time, keeping the event indicators synchronized with their corresponding instruction. Given the large number of event indicators, the accumulated event register 362 would typically be a relatively large register. For example, the accumulated event register 362 could include over a hundred bits in a typical modern processor. The output of the accumulated event register 362 thus comprises a series of bits, with the series of bits together comprising the event indicators 308. Thus, the described implementation supports the qualification, pipeline synchronization and accumulation of raw event indicators 304 from a plurality of pipeline stages into a single accumulated event register 362 which then interfaces into the counters of the performance monitor.

Figure 5:
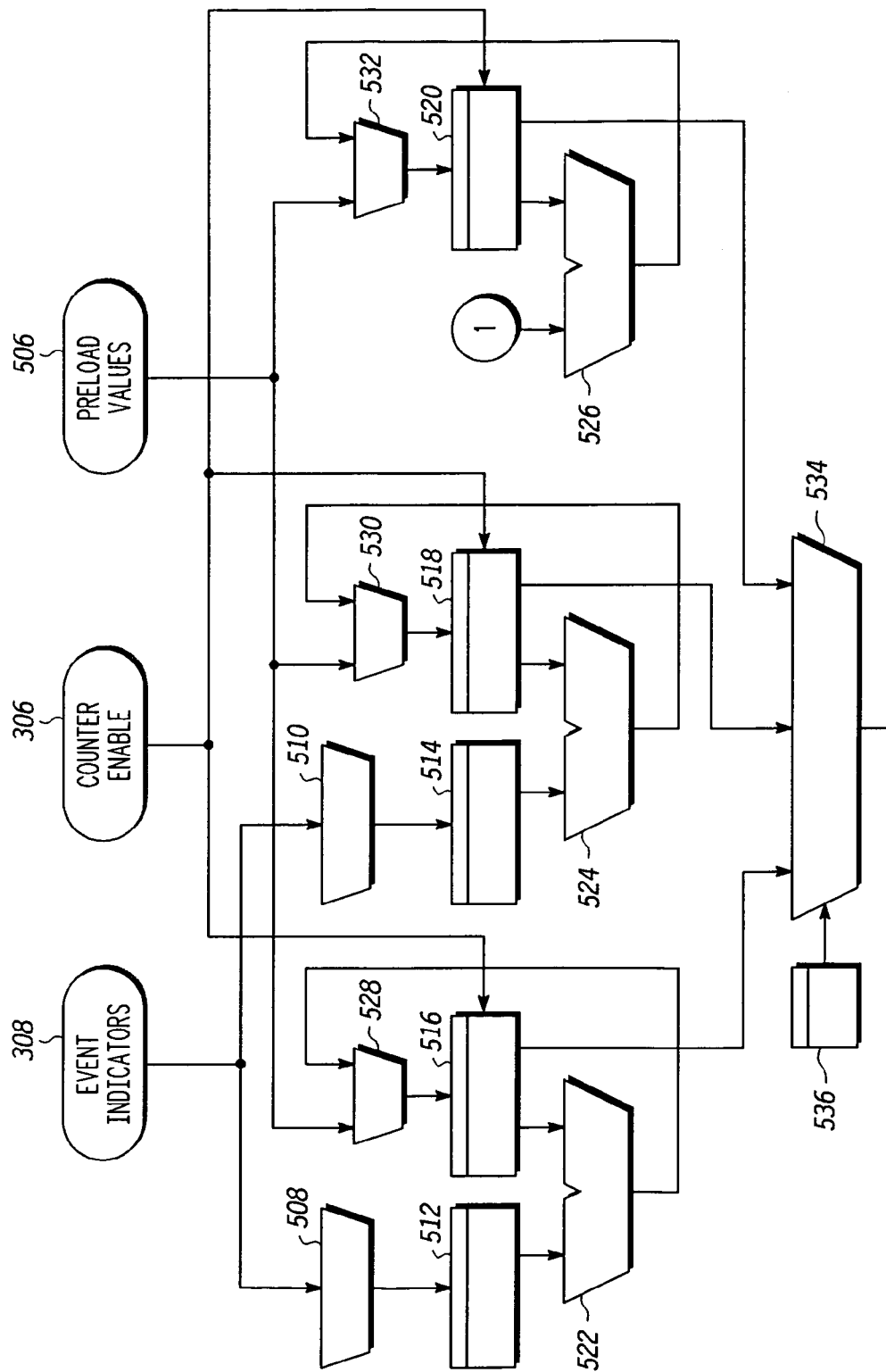
FIG. 5 is a schematic view of a processor portion in accordance with an embodiment of the invention.

Turning now to FIG. 5, a schematic view of a third processor portion 500 is illustrated. In general, processor portion 500 receives event indicators 308, a counter enable signal 306, and preload values 506. For example, the processor portion 500 can receive the event indicators and counter enable signal from the processor portion 300 illustrated in FIG. 3. The processor portion 500 includes event selection multiplexers 508 and 510, selected event registers 512 and 514, counter registers 516, 518 and 520, adders 522, 524, and 526, preload selection multiplexers 528, 530 and 532, read multiplexer 534 and output select register 536.

In general, the counter registers 516 and 518 serve as counters, counting selected events indicators 308 when enabled by the counter enable signal 306. Likewise, the counter register 520 serves as a dedicated clock cycle counter, counting clock cycles when enabled by the counter enable 306. In one embodiment, the counter registers 516, 518 and 520 each comprise a 64-bit register.

During operation, the event indicators are passed to the event selection multiplexers 508 and 510. Each event selection multiplexer select one or more bits that correspond to a selected event indicator, and passes the selected event indicator bit(s) to the corresponding selected event registers 512 and 514. For example, if it is desired to count cache misses and instructions, the corresponding events indicators are selected by multiplexers 508 and 510, and passed to the corresponding selected event registers 512 and 514. The number of selected event indicators in a clock cycle is stored in the corresponding event register, and passed to the adders 522 and 524 each clock cycle. At the adders 522 and 524, the number of selected event indicators is added to the previous counted event indicators in counter registers 516 and 518. The output of the adders 522 and 524 are then fed back through preload selection multiplexers 528 and 530, and back into the counter registers 516 and 518. The counter registers 516 and 518 are updated at the next appropriate clock edge when the counter enable signal 306 is asserted. Thus, when enabled by the counter enable signal 306, the counter registers 516 and 518 serve as counters, counting selected events indicators 308.

Likewise, the counter register 520 is used to count clock cycles. The adder 526 increments (adds "1") the previous counted clock cycles in counter register 520. Thus, when enabled by the counter enable signal 306, the counter register 520 counts clock cycles.

The preload selection multiplexers 528, 530 and 532 are used to load preload values 506 into the counter registers. The preloading of values facilitates the use of the counters to count to selected values before running over and triggering an event. Specifically, the counter registers 516, 518 and 520 can each be configured to generate an interrupt or other event each time they overflow. Thus, the counters can then be used to count to a specified value by loading the appropriate preload value 506 into the register through the appropriate preload selection multiplexer. When an overflow occurs, the values in the other control registers can then be retrieved and used for performance evaluation.

The output select register 536 is used by the processor to decode and read the contents of counter registers 514, 518 and 520. Specifically, the output select register 536 can be used to control read multiplexer 534 to allow the three counter registers 516, 518 and 520 to be read as memory mapped registers. This facilitates access of the values in the counter registers by the processor.

The hardware performance monitor illustrated in FIGS. 2-5 thus provides very precise control of the starting and stopping of the counter registers 516, 518 and 520, and can thus provides accurate performance monitoring. Specifically, during operation of the performance monitor, the counter registers 516, 518 and 520 are controlled to start and stop at specific instruction addresses, as specified in control registers 206 and 208. Thus, the performance monitor is able to precisely control event counting to coincide with selected instruction addresses that correspond to specific pieces of code in the system.

In some embodiments, the performance monitor can be configured selectively operate in several different manners. For example, using a programmable control field, the performance monitor can be configured to selectively start and stop each time a selected instruction address in the control register matches the instruction address of the currently executing instruction. Thus, the performance monitor can count events through multiple executions of a selected code section of interest automatically. Then, using a different value in the programmable control field the performance monitor can be configured to selectively start and stop only once when the instruction addresses match. Then, using a third value in the programmable control field can configure to operate the performance monitor as traditional performance monitor, with the starting and stopping controlled explicitly. In this embodiment the performance monitor can be configured to unconditionally count when selected control fields are enabled, and unconditionally stop when the selected control fields are disabled. Thus, the performance monitor can be implemented and controlled to operate with great flexibility.

The present invention thus provides a system and method for performance monitoring in processors. In general, the performance monitor evaluates the performance of the processor by counting selected events during one or more defined periods. The performance monitor provides improved performance characterization by providing highly-configurable start-stop control over the event counting.

In a first embodiment, the performance monitor comprises a control register, the control register configured to store a first instruction address; comparator coupled to the control register, the comparator configured to receive an current instruction address, the comparator comparing the current instruction address to the first instruction address; and a counter coupled to the comparator, the counter including an input to receive event indicators, the counter starting counting of the received event indicators when the current instruction address corresponds to the first instruction address.

In a second embodiment, a method for control monitoring comprising storing a first instruction address and a second instruction address, comparing a current instruction address to the first instruction address and the second instruction address, starting counting of received event indicators when the current instruction address corresponds to the first instruction address, and stopping counting of the received event indicators when the current instruction address corresponds to the second instruction address.

In a third embodiment, the performance comprises a first control register, the first control register configured to store a first instruction address of a processor; a second control register, the second control register configured to store a second instruction address; a first comparator coupled to the first control register, the first comparator configured to receive an current instruction address, the first comparator comparing the current instruction address to the first instruction address; a second comparator coupled to the second control register, the second comparator configured to receive the current instruction address, the second comparator comparing the current instruction address to the second instruction address; a first event counter coupled to the first and second comparators, the first event counter including an input to receive a selected event indicator from a plurality of event indicators, the first event counter starting counting of the selected event indicators when the current instruction address corresponds to the first instruction address, the first event counter stopping counting of the selected event indicators when the current instruction address corresponds to the second instruction address; and a control field, the control field selectively configuring the first event counter to start counting each time the current instruction address corresponds to the first instruction address and stop counting each time the current instruction address corresponds to the second instruction address.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A performance monitor for monitoring performance on a processor, the performance monitor comprising:

a control register, the control register configured to store a first instruction address, and wherein the control register is further configured to store a second instruction address;

a comparator coupled to the control register, the comparator configured to receive an current instruction address, the comparator comparing the current instruction address to the first instruction address, and wherein the comparator is configured to compare the current instruction address to the second instruction address;

a counter coupled to the comparator, the counter including an input to receive event indicators, the counter starting counting of the received event indicators when the current instruction address corresponds to the first instruction address, and wherein the counter stops counting of the received event indicators when the current instruction address corresponds to the second instruction address; and a clock cycle counter, the clock cycle counter including an input to receive clock cycles, the clock cycle counter starting counting of the received clock cycles when the current instruction address corresponds to the first instruction address, the clock cycle counter stopping counting of the received clock cycles when the current instruction address corresponds to the second instruction address.

2. The performance monitor of claim 1 wherein the counter is configured to start counting each time the current instruction address corresponds to the first instruction address and stop counting each time the current instruction address corresponds to the second instruction address.

3. The performance monitor of claim 2 wherein performance monitor is selectively configured to start each time and stop each time using a control field.

4. The performance monitor of claim 3 wherein the counter is selectively configured to start counting unconditionally and selectively configured to stop counting unconditionally by a control field.

5. The performance monitor of claim 1 wherein the counter is controlled to start counting on a next instruction boundary when the current instruction address corresponds to the first instruction address, and wherein the counter is further controlled to stop on the next instruction boundary when the current instruction address corresponds to the second instruction address.

6. The performance monitor of claim 1 wherein the control register comprises a first and second control register, the first control register configured to store the first instruction address and the second control register configured to stored the second instruction address, and wherein the comparator comprises a first comparator and a second comparator, the first comparator comparing the current instruction address to the first instruction address, the second comparator comparing the current instruction address to the second instruction address.

7. The performance monitor of claim 1 wherein the counter triggers an interrupt when the counter reaches an overflow state.

8. The performance monitor of claim 1 wherein the current instruction address is received from a program counter coupled to the comparator.

9. A performance monitor for monitoring performance on a processor, the performance monitor comprising:

a control register, the control register configured to store a first instruction address;

a comparator coupled to the control register, the comparator configured to receive an current instruction address, the comparator comparing the current instruction address to the first instruction address;

a counter coupled to the comparator, the counter including an input to receive event indicators, the counter starting counting of the received event indicators when the current instruction address corresponds to the first instruction address; and wherein the control register is further configured to store an address attribute, the address attribute specifying a selected processor operational mode, and wherein the comparator compares the address attribute to determine if the processor is operating in the selected processor operational mode, and wherein the counter is configured to start counting of the received event indicators when the current instruction address corresponds to the first instruction address and the processor is in the selected processor operational mode.

10. A performance monitor for monitoring performance on a processor, the performance monitor comprising:

a control register, the control register configured to store a first instruction address;

a comparator coupled to the control register, the comparator configured to receive an current instruction address, the comparator comparing the current instruction address to the first instruction address;

a counter coupled to the comparator, the counter including an input to receive event indicators, the counter starting counting of the received event indicators when the current instruction address corresponds to the first instruction address; and wherein the control register is further configured to store an address attribute, the address attribute identifying an address space in virtual memory operation, and wherein the comparator compares the address attribute to determine if the processor is processing the address space in virtual memory operation, and wherein the counter is configured to start counting of the received event indicators when the current instruction address corresponds to the first instruction address and the address attribute identifies the address space in virtual memory operation.

11. A method for performance monitoring a processor, the method comprising:

storing a first instruction address and a second instruction address;

comparing a current instruction address to the first instruction address and the second instruction address;

starting counting of received event indicators when the current instruction address corresponds to the first instruction address;

starting counting of clock cycles when the current instruction address corresponds to the first instruction address:

stopping counting of the received event indicators when the current instruction address corresponds to the second instruction address; and stopping counting of the clock cycles when the current instruction address corresponds to the second instruction address.

12. The method of claim 11 wherein the starting counting and stopping counting occur each time the current instruction address corresponds to the second instruction address.

13. The method of claim 11 wherein the starting counting occurs on a next instruction boundary when the current instruction address corresponds to the first instruction address, and wherein the stopping counting occurs on the next instruction boundary when the current instruction address corresponds to the second instruction address.

14. The method of claim 11 further comprising the step of receiving the current instruction address from a program counter.

15. The method of claim 11 further comprising storing an address attribute, the address attribute specifying a selected processor operational mode, and further comprising comparing the address attribute to determine if the processor is operating in the selected processor operational mode, and wherein starting counting of received event indicators occurs only when the current instruction address corresponds to the first instruction address and the processor is in the selected processor operational mode.

16. A performance monitor for monitoring performance in a processor, the performance monitor comprising:

a first control register, the first control register configured to store a first instruction address of a processor;

a second control register, the second control register configured to store a second instruction address;

a first comparator coupled to the first control register, the first comparator configured to receive an current instruction address, the first comparator comparing the current instruction address to the first instruction address;

a second comparator coupled to the second control register, the second comparator configured to receive the current instruction address, the second comparator comparing the current instruction address to the second instruction address;

a first event counter coupled to the first and second comparators, the first event counter including an input to receive a selected event indicator from a plurality of event indicators, the first event counter starting counting of the selected event indicators when the current instruction address corresponds to the first instruction address, the first event counter stopping counting of the selected event indicators when the current instruction address corresponds to the second instruction address;

a control field, the control field selectively configuring the first event counter to start counting each time the current instruction address corresponds to the first instruction address and stop counting each time the current instruction address corresponds to the second instruction address; and a clock cycle counter coupled to the first and second comparators, the clock cycle counter including an input to receive clock cycles, the clock cycle counter starting counting of the clock cycles when the current instruction address corresponds to the first instruction address, the first event counter stopping counting of the clock cycles when the current instruction address corresponds to the second instruction address.

17. The performance monitor of claim 16 further comprising a second event counter coupled to the first and second comparators, the second event counter including an input to receive a second selected event indicator from the plurality of event indicators, the second event counter starting counting of the second selected event indicators when the current instruction address corresponds to the first instruction address, the first event counter stopping counting of the second selected event indicators when the current instruction address corresponds to the second instruction address.

* * * * *